Feb. 10, 1925.
E. WEBER
1,525,679
JUVENILE VEHICLE
Filed March 5, 1924
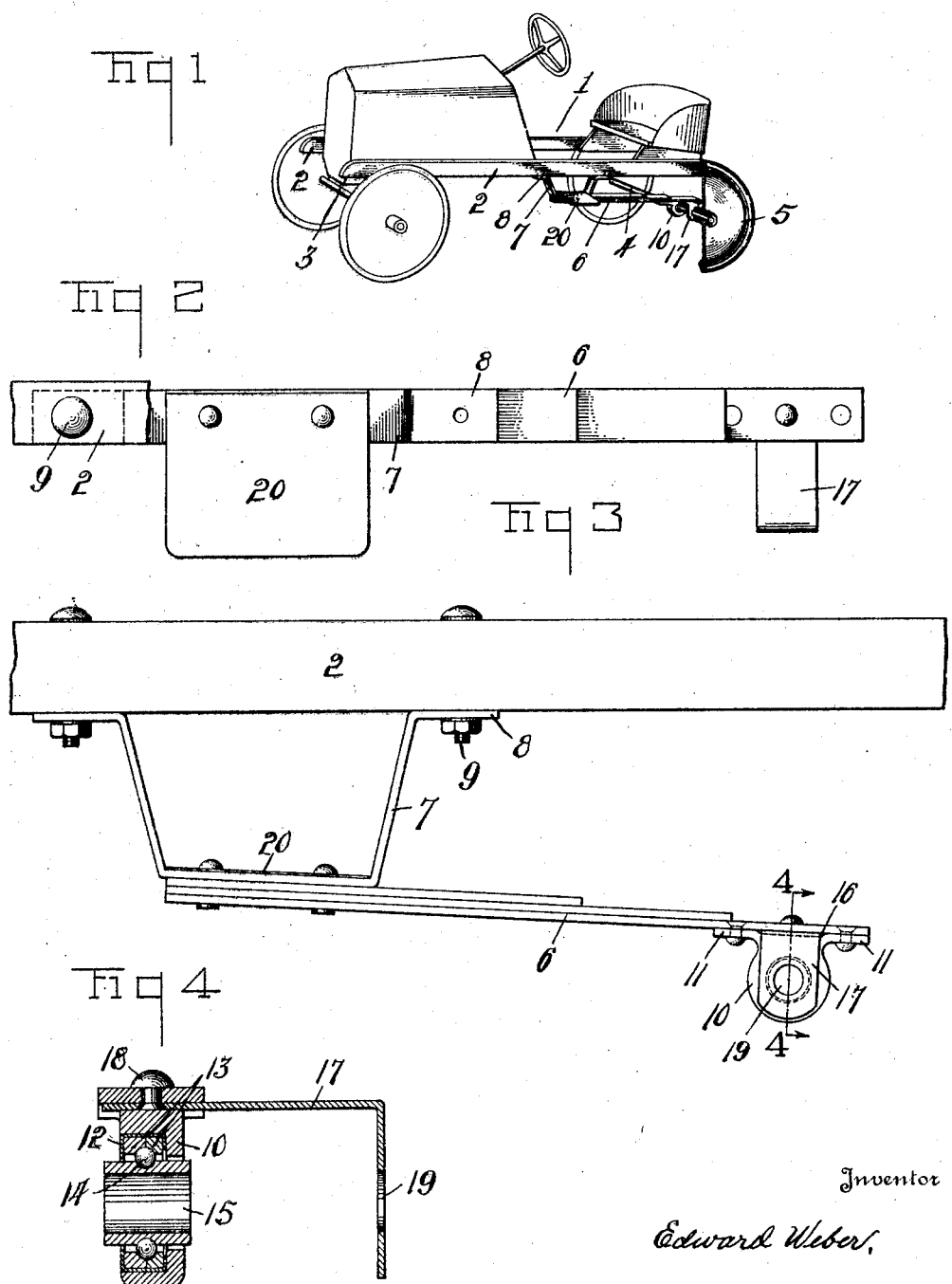
Inventor
Edward Weber,
By Owen Owen & Crampton,
Attorneys.

Patented Feb. 10, 1925.

1,525,679

UNITED STATES PATENT OFFICE.

EDWARD WEBER, OF TOLEDO, OHIO, ASSIGNOR TO THE AMERICAN-NATIONAL COMPANY, OF TOLEDO, OHIO, A CORPORATION OF OHIO.

JUVENILE VEHICLE.

Application filed March 5, 1924. Serial No. 696,978.

*To all whom it may concern:*

Be it known that I, EDWARD WEBER, a citizen of the United States, and a resident of Toledo, in the county of Lucas and State of Ohio, have invented a new and useful Juvenile Vehicle, which invention is fully set forth in the following specification.

This invention relates to juvenile vehicles, and has for its primary object the provision of a simple, efficient and novel spring support for the body and associated axle bearing, whereby to enhance the practicability and commercial value of such vehicles.

A further object of the invention is the provision of a simple and durable connection between the body and carrying spring of a vehicle of the class described, which connection also serves as a step member for the vehicle.

The invention is fully described in the following specification, and while, in its broader aspect, it is capable of embodiment in numerous forms, a preferred embodiment thereof is illustrated in the accompanying drawings, in which, Figure 1 is a perspective view of a juvenile vehicle embodying the invention, with a part broken away; Fig. 2 is an enlarged plan view of the feature embodying the invention, with the associated side bar of the vehicle frame fragmentarily shown; Fig. 3 is a side elevation thereof, and Fig. 4 is an enlarged section on the line 4—4 in Fig. 3.

Referring to the drawings, 1 designates the vehicle body having the opposed side or longitudinal frame bars 2 mounted at their forward ends on the front axle 3 and at their rear ends on the rear axle 4, which latter is usually the drive axle of the vehicle. Wheels 5 are mounted on the ends of the axles.

The invention resides in the spring connection between the body 1 and rear axle 4, and includes a spring and bar 6 below each frame bar 2 of the vehicle, such spring bar being preferably of leaf form with the leaves extending from the forward end and graduated in length as shown. The forward end of each spring bar is riveted or otherwise rigidly secured to the under side of the cross-bar portion of a U-shaped bracket 7, preferably of strap metal, the spring extending lengthwise of the bracket cross-bar and the bracket legs having outwardly turned feet 8 that seat up against the under sides of the respective frame bars 2 and are secured thereto by bolts 9 or in any other suitable manner.

The rear end of each spring bar has a bearing bracket 10 riveted or otherwise rigidly secured, in the present instance, to its under side, such a bracket in its present form being of ring shape and having apertured feet 11 projecting in opposite directions from its top portion in a plane transverse to the bracket axis for seating against the spring and receiving the securing means.

One end of the opening of the bracket 10 is enlarged and an annular cage or retainer 12 of internal channel form is pressed into such enlargement and carries a pair of cooperating ball race rings 13 therein. A set of ball bearings 14 is disposed between the rings 13 and a race provided on a bearing bushing 15, which receives the adjacent end of the axle 4, and turns therewith. The top of the bracket 10 is provided with a recess 16 between the feet 11, to provide a shallow space between the central portion of the bracket and the spring bar 6 for receiving the inner end of an angled bearing arm 17 that is rigidly secured to the spring bar by a rivet 18 or in any other suitable manner. The arm 17 extends a distance outward from the spring 6 and has its free end portion downwardly angled in spaced relation to the bushing 15 and provided with a bearing opening 19 in axial alignment with the bushing opening to receive a form and bearing for the shaft 4 in outwardly spaced relation to the bushing, the wheel receiving end of the shaft projecting beyond such bearing. This provides a double bearing for each end portion of the axle, thereby acting as a strengthening and bracing means for the axle.

The U-shaped bracket 7 forms a side stirrup or step for the vehicle and the stepping surface thereof is broadened and projecting outwardly from the bracket side by mounting a step plate 20 in the stirrup and securing its inner end portion to the top side of the bracket cross-bar by the rivets or members employed to secure the spring 6 to such bar.

I wish it understood that my invention is not limited to any specific construction, arrangement or form of the parts, as it is capable of numerous modifications and changes without departing from the spirit of the claims.

Having thus described my invention, what I claim as new, and desire to secure by Letters Patent, is,—

1. In a juvenile vehicle, a body frame, an axle, a U-shaped bracket secured to and depending from the frame with its cross-bar at its lower end forming a step, a spring bar fixedly secured at one end to the under side of the bracket cross-bar lengthwise thereof, a bearing bracket carried by the free end of the spring bar and an anti-friction bearing mounted in the bearing bracket and receiving the axle.

2. In a juvenile vehicle, a body frame, a drive axle, a spring bar fixed at one end to the frame and disposed beneath the frame lengthwise thereof, a bearing bracket fixed to the free end portion of the spring and having an opening therethrough, and anti-friction bearing means for the axle mounted in said bracket and an angled bearing arm projecting laterally from the spring and having a bearing part spaced from and in alignment with the bearing of said bracket.

3. The combination with a longitudinal frame bar and the drive axle of a juvenile vehicle, of a U-shaped stirrup member secured to and depending from the side bar, a step plate mounted in and projecting laterally from said member, a spring bar secured at one end to the underside of a stirrup member and extending lengthwise of the side bar, and bearing means for the axle carried by the free end of the spring bar.

In testimony whereof I have hereunto signed my name to this specification.

EDWARD WEBER.